Patented Apr. 13, 1954

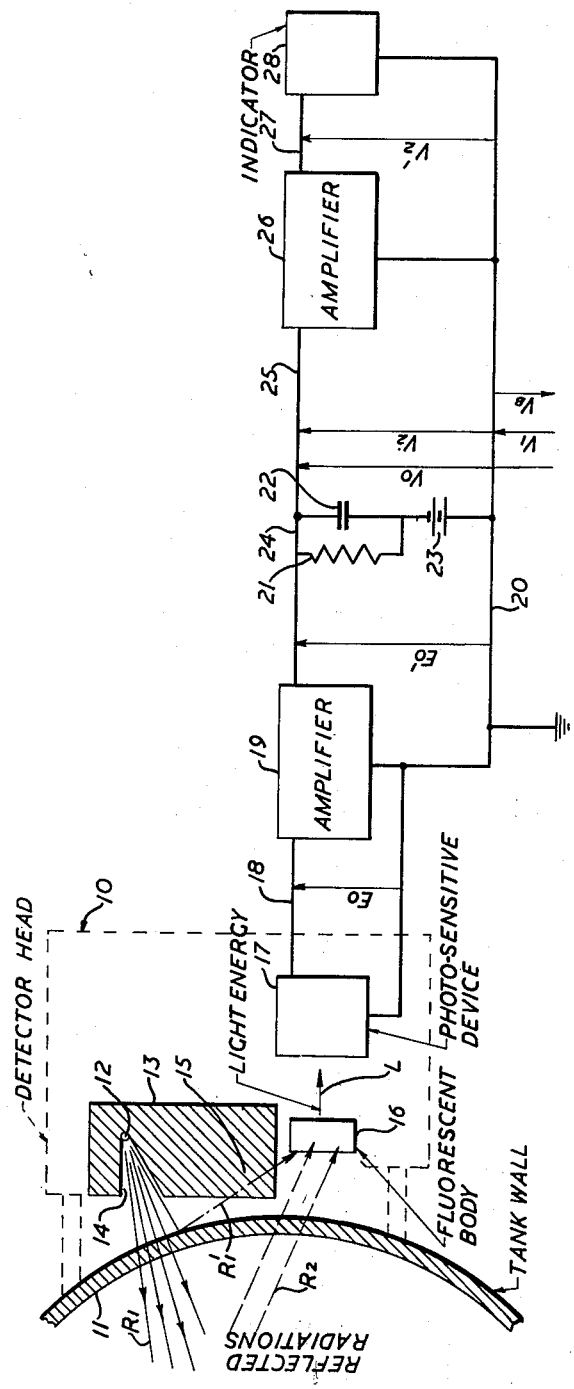

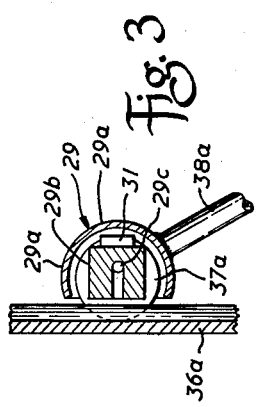
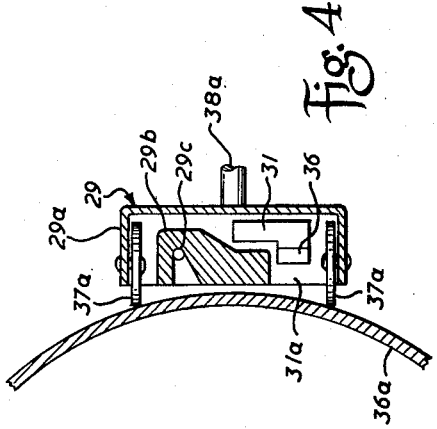
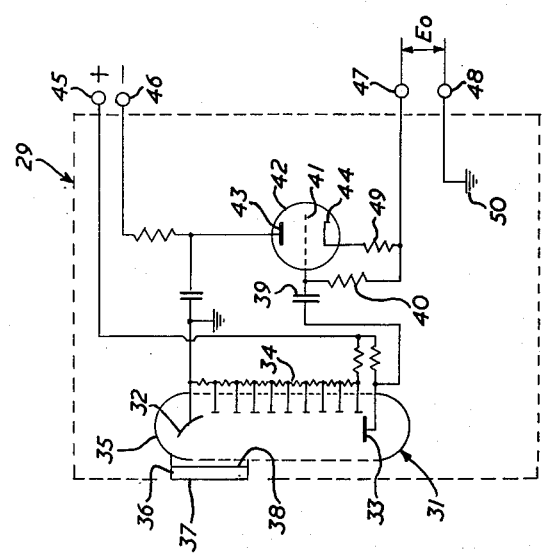

2,675,478

UNITED STATES PATENT OFFICE 2,675,478

LIQUID LEVEL GAUGE

Donald C. Brunton and Norman Z. Alcock, Oakville, Ontario, Canada, assignors to Isotope Products Limited, Oakville, Ontario, Canada, a company of Ontario Application July 27, 1951, Serial No. 238,880

5 Claims. (Cl. 250—43.5)

This invention relates to a method of and apparatus for obtaining information concerning an object by converting gamma or beta radiation coming therefrom to light energy and converting the latter to electrical energy to actuate an indicator. More specifically the invention concerns a device for determining the presence or level of a substance in a container formed of a different substance.

In prior methods of determining information with respect to an object by utilizing radio-active source in combination with detecting means for determining the physical characteristics of the object from the resulting radiation coming therefrom, the source employed has in most cases been radium of an activity of about one millicurie. In nearly all cases Geiger counters and ionization chambers have been employed as detecting devices. An inherent characteristic of such systems and methods is the low activity of the source and low efficiency of the detector whereby necessary statistical accuracy usually requires a time element of the order of twenty seconds for any one indication or measurement. Such prior devices and methods may be improved in efficiency by modification to handle large amounts of radiation but such modification is necessarily accompanied by an increase in bulk in the equipment which becomes impractical from a portable aspect if a short time delay in readings and desirable efficiencies are to be arrived at.

It is the main object of the present invention to provide a device and method for determining information concerning an object by radiation technique wherein the efficiency is of the order of ten to one hundred times that previously obtainable by easily portable equipment.

Another object of the invention is to provide a device and method as before wherein the source is of an activity between five and fifty millicuries and wherein the detector is in the form of a fluorescent body adapted to emit light energy when excited by beta or gamma radiation in combination with a photo-sensitive device for converting the light energy to electrical energy in the form of signal pulses corresponding to radiation pulses from the position of the object and containing information with respect to the latter.

A further object of the invention is to provide a device and method as before adaptable for measuring the level of the material in the vessel and wherein the electrical signal pulses are converted to a direct current signal proportional to the mean value of such pulses and wherein means are included in combination therewith for biasing such direct current signal to remove a component thereof corresponding to radiation coming from the wall of the vessel.

With these and other objects in view the invention generally comprises a fluorescent body adapted to emit light energy when excited by beta or gamma radiation positioned to direct the light energy to a photo-sensitive device which converts the light energy to electrical energy in the form of signal pulses corresponding to radiation pulses coming from the position of the object being examined. The electrical signal pulses are applied to an electrical resistor and capacitor disposed electrically in parallel, the latter being of a time constant preferably greater than one-tenth of a second. The resistor and capacitor act to convert the signal pulses substantially to a non-pulsating direct current signal which is proportional to the mean value of the signal pulses. In particular, the invention contemplates a method and means for removing an undesired component of the direct current signal corresponding for example to the wall of a vessel containing a material, the level of which is desired to be measured by applying the necessary biasing to the direct current signal. Indicating means responsive to the resulting direct current signal may be of any simple form and may in some instances indicate not only the presence of such residual direct current signal but also its magnitude.

Other objects of the invention will be appreciated by a study of the following specification taken in conjunction with the accompanying drawings.

In the drawings,

Figure 1 is a general schematic of the essentials of apparatus according to the invention of that class adaptable for determining the level of a material in a vessel.

Figure 2 is an electrical schematic of one specific form of detector head according to the invention.

Figures 3 and 4 are sectional views of the mechanical construction of the detector head of Figure 2.

Figure 5:
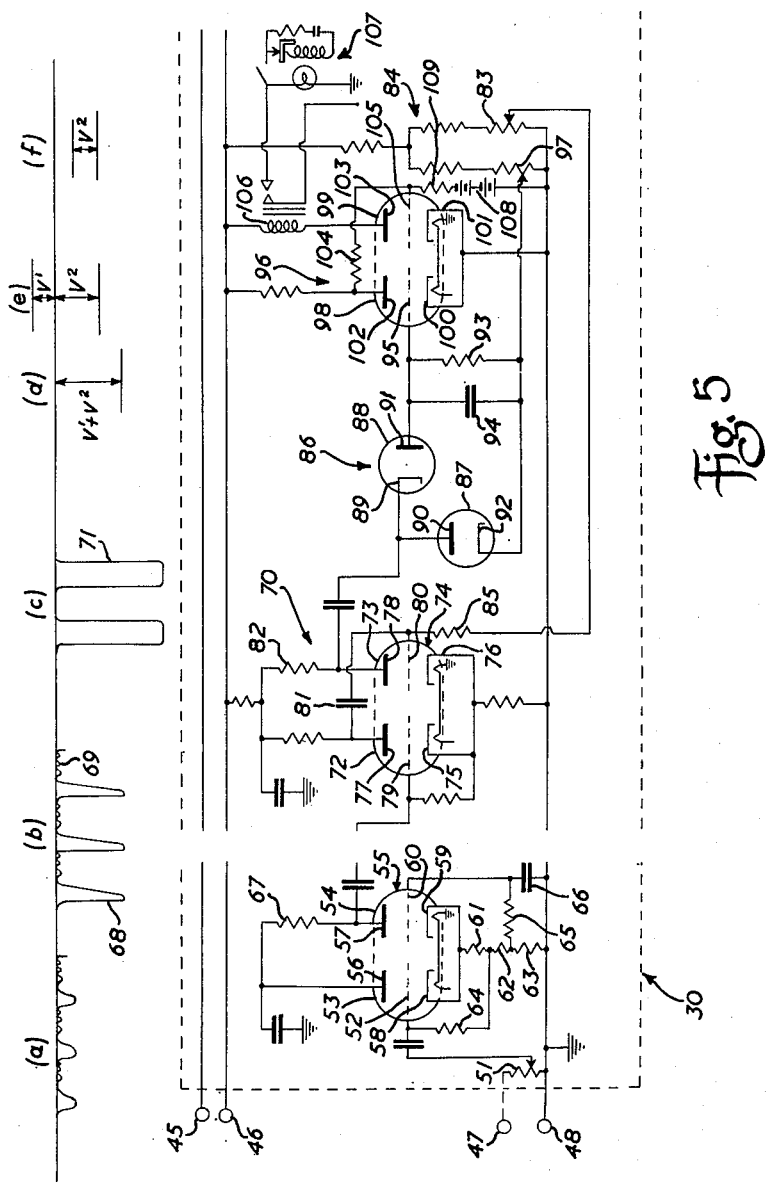
Figure 5 is an electronic circuit diagram of one practical form of unit which may be employed with the detector head of Figures 2 to 4 in measuring the level of material within a vessel but which has multiple amplifiers eliminated therefrom for simplicity in illustration.

In Figure 1 a general layout of the essentials of a system according to the invention is illustrated wherein the detector head 10 is of a character particularly adapted to the measuring of the level of a material within a vessel having a wall 11. The detector head comprises a source 12 preferably emitting gamma radiation of an activity between five and fifty millicuries and preferably twenty millicuries. The source is imbedded in a body of lead 13 acting as a shield and having a diverging slot 14 therein serving to direct the radiation pulses, in the paths indicated by the arrows R1. Certain of these rays may reflect off the wall 11 by the path R1¹ but which must pass through a barrier portion 15 of the body 13 before passing into the fluorescent body 16. Other rays of radiation from the source 14 may be reflected from material within the vessel in the direction of the arrows R2 to enter the fluorescent body 16.

As hereinafter disclosed in more detail, the slot 14 of the lead body 13 is of such character that the emission beam is of small depth so that the upper limits of material within the vessel can be critically determined by the position of the detector head on the vessel wall. Where the detector head is in a position above the material in the vessel only the rays R1¹ are reflected to the fluorescent body 16 from the vessel wall 11.

The fluorescent body is of that class which is substantially transparent to its own light energy. Examples of such materials are:

Napthalene
Antracene
Stilbene
Terphenyl
Sodium iodide (thallium impregnated)
Potassium iodide (thallium impregnated)
Calcium tungstate Light energy directed in the path L strikes a photo-sensitive device 17 adapted to convert the light energy to electrical energy in the form of a pulsating direct current signal hereinafter referred to as signal pulses of a mean magnitude Eo. The photo-sensitive device is connected by suitable lead 18 to an amplifier 19, both the photo-sensitive device 17 and the amplifier 19 being connected to the grounded line 20. The signal pulses of a mean voltage value Eo¹ are developed from the amplifier and are applied to the resistor 21 and condenser 22 disposed electrically in parallel between a battery source biasing means 23 and the signal connecting line 24. The resistor-condenser combination is of a time constant preferably greater than one-tenth of a second and serves to smooth out the pulsating direct current of the signal to deliver an effective direct current signal of substantially non-pulsating characteristics of a magnitude Vo corresponding to the sum of V1 plus V2 wherein V1 corresponds in its magnitude to the mean value of that portion of the signal pulses representing reflected radiation R1¹ from the vessel wall 11. V2 in like manner corresponds to the reflected radiation R2 from the object or material in the vessel. As indicated, the biasing means, in the form of the battery 23 acting between the grounded line 20 and the resistor and condenser in parallel, is of a value Vb corresponding to but opposing the vessel wall reflected portion V1 of the direct current signal, whereby the resulting direct current signal V2 is applied through the line 25 to the amplifier 26 giving a direct current signal V2¹ connected through the line 27 to a suitable indicator 28 actuable thereby.

As indicated in more detail hereinafter the biasing means effects cancellation of undesired components of the signal pulses and is not necessary in cases where one is not confronted with the problems of interfering reflections such as in the case where the object being subjected to radiation is directly in the path of radiation from the source and is between the source and the fluorescent body. In such cases, also, the indicator may be of the class not only indicating the mere presence of the signal V2¹ but also capable of indicating its magnitude whereby the thickness, density and certain other characteristics of an object may be determined. In more detail, one practical form of instrument which may be fabricated in portable form is illustrated in Figures 2 to 5 and embodies two main components, a detector head 29 illustrated in Figures 2 to 4 and an amplifier and indicating unit 30, the essentials of the main stages of which are illustrated in Figure 5.

Referring to Figure 2, the electronic circuit components of the detector head 10 comprises a photo-multiplier class of photo-electric vacuum tube 31 having a photo-sensitive cathode 32, an anode 33 and a plurality of diodes 34. Adjacent the cathode and on the outer surfaces of the tube envelope 35 is mounted a body of thallium impregnated sodium iodide as a fluorescent body 36. The outer surface 37 of this body is disposed in the housing of the detector head in exposed relation having a thin mirror surface thereon such as a thin coating of silver. The inner surface 38 of this body is cemented to the glass of envelope 35 of the tube by means of a suitable cement such as Canada balsam, having an index of refraction between the index of refraction of the glass of the envelope and the index of refraction of the fluorescent body.

The photo-multiplier tube 31 is coupled in a conventional manner through condenser 39 and resistor 40 through the grid 41 of a triode 42 or equivalent having an anode 43 and a cathode 44. The photo-multiplier tube has a separate source of high voltage supplied at the terminal 45, the terminal 46 representing the high voltage line for the following amplifier illustrated in Figure 5. The signal puses Eo are derived from terminals 47 and 48 in series with the cathode resistor 49 and the ground connection 50 in a cathode follower system whereby a relatively long connecting cable may extend from the detector head to the following stages illustrated in Figure 5.

The detector head 29 in its mechanical construction may be of the form illustrated in Figures 3 and 4 wherein the components are housed within the casing 29a. A lead body 29b supports the gamma ray source 29c in the manner illustrated in Figure 1. The photo-multiplier electronic tube 31 has mounted thereon the fluorescent body 36 disposed in the opening 31a to receive reflected radiations from within the tank wall 36a. The casing 29a preferably carries a pair of wheels 37a to assist in determining the relative positions of the source of gamma radiation, the tank wall and the fluorescent body 36. A suitable handle 38a fastens to the casing which latter mounts all of the components shown in Figure 2, the handle serving, if desired, as a tube through which a connecting cable may pass to the indicating unit 30.

A cable of the detector head connects to the corresponding voltage and signal terminals 45 to 48 (shown in Figure 5) the signal voltage Eo being applied to the potentiometer 51 serving as an overall gain control on all stages and from which the signal is fed to the grid 52, a pair of triodes 53 and 54 within the same envelope 55 having anodes 56 and 57, cathodes 58 and 59, and a second grid 60. The cathode end of the circuitry is known as a "long tail pair" which effects a non-saturable method of amplification when driven by negative input pulses. It will be observed that the signal pulses applied to the grid 52 are derived from the cathode follower amplifier tube 42 (Figure 2).

The cathodes 58, 59 are connected to ground through three series resistors 61, 62 and 63, the grid resistor 64 connecting to a point between resistors 61 and 62 determines the bias of the first grid 52, the bias of the second grid 60 being determined by the potential at the juncture of resistors 62 and 63.

The cathode resistance is divided into three separate resistors 61, 62 and 63 to provide separate bias points for the grids 52 and 60 respectively, wherein the second grid 60 is in effect less positive than the grid 52. The grid leak 65 establishes a direct current connection between the second grid 60 and the biasing potential established between the resistors 62 and 63. Condenser 66 is a by-pass condenser maintaining the voltage on the grid 60 at a constant value independent of signal.

In operation, the negative signal on the grid 52 causes a corresponding negative signal on the pair of cathodes 58, 59. This is the equivalent of a positive signal on the grid 60 causing current to flow through the anode or plate resistor 67 and giving rise to a negative signal on plate 57. It is clear from the operation whereby negative signals are fed in on the grid 52 and negative signals are extracted on plate 57 that any number of these stages could be added in series without upsetting the phase relationship in the circuit and that since the grid 60 is held fixed and the cathode 59 cannot be depressed below 0 volts, there is a limit to the pulse size that can arise on plate 57 independent of the size of pulse fed into grid 52. In effect the original pulses represented at (a) regardless of their magnitude are converted to pulses 68 of relatively uniform magnitude having a random noise level 69 running therethrough.

A wave shaping and discriminating stage 70 follows and serves to convert the desired pulses 68 into the square wave form 71 illustrated at C at the same time eliminating noise by discrimination method. In operation, a square wave is produced for each pulse 68 of a magnitude rising above the discriminating value.

The wave shaping and discriminating stage is comprised of a pair of triodes 72 and 73 within the same envelope 74 having the commonly connected cathodes 75 and 76 opposing anodes 77 and 78 respectively. The negative signal on grid 79 is amplified in tube 72 to produce a positive signal on anode 77. This positive signal in turn is fed to grid 80 through the condenser 81. The increased potential on grid 80 causes current to flow in tube 73 decreasing the anode volts on the plate 78 and increasing the volts on the common cathode 76. This increase in cathode volts acts back on tube 72 to further shut off the current being passed and the action triggered in this manner reduces the current through tube 72 to a small value and increases the current in tube 73 to maximum value determined by the plate supply volts. Thus the magnitude of the output pulse is determined by the current capacity of tube 73 and the value of the anode or plate resistance 82.

Tube 73 is normally held in a non-conducting state by the biased potentiometer 83 in the voltage divider network 84 which sets the potential of grid 78 through grid lead 85 at a value from ten to sixty volts below the potential of the common cathodes 75 and 76. Consequently pulses on the input grid 79 whose magnitude when amplified in tube 72 and transmitted to grid 78 are insufficient to initiate the trigger action and are not passed on as pulses to the subsequent part of the circuit. The square waves 71 are converted to a direct current signal proportional to the magnitude of the square waves and the number generated per second by an integrating stage 86 comprising a pair of diodes 87 and 88 to which the signal voltage is applied at the cathode 89 of one and the anode 90 of the other, and the resistor 93 and condenser 94. The remaining anode 91 and cathode 92 of the respective diodes are connected to the resistor 93 and condenser 94 disposed in parallel thereacross, the diodes serving as an alternating current coupling mechanism to the resistor-condenser combination having values of one megohm and two microfarads respectively, being together of an essential time constant greater than one-tenth of a second and of the order of two seconds in the present instance.

A substantially non-pulsating form of direct current of the form illustrated at (d) having components V1 plus V2 is developed on the resistor 93 but wherein the overall voltage developed between the grid 95 and the output amplifying stage 96 and ground corresponds only to the desired portion of the signal voltage. Accordingly, biasing means in the form of a potentiometer 97 in the voltage dividing network 94 serves to establish a positive biasing on grid 95 as represented at (e) whereby the desired signal voltage V2 alone arrives at the grid 95.

The output stage 96 involves a pair of triodes 98 and 99 having the commonly joined cathodes 100 and 101 opposing anodes 102 and 103 respectively. The negative voltage on grid 95 is amplified in tube 98 to a larger positive voltage on anode 102. This voltage is direct current coupled through resistor 104 to grid 105 of tube 99. This signal is used to turn on current in tube 99 to actuate relay 106 which in turn actuates the indicator mechanism 107. The tube 99 is held in a normally non-conducting state by the biased battery 108 in conjunction with the coupling resistor 109 and 104.

What we claim as our invention is:

1. Apparatus for determining the level of material in a vessel, comprising in combination: a source of gamma radiation of an activity between five and fifty millicuries, a fluorescent body adapted to emit light energy when excited by beta or gamma radiation and being substantially transparent to said light energy, a photosensitive device for converting said light energy to electrical energy in the form of signal pulses corresponding to reflected radiation pulses from the wall of the vessel and the material therein, an electrical resistor and capacitor disposed electrically in parallel of a time constant greater than one-tenth of a second, means for applying said signal pulses to said resistor and capacitor to convert the signal pulses to a direct current signal proportional to the mean value of the signal pulses, and means including an independent source of direct current for biasing said direct current signal to remove a component thereof corresponding to the reflected radiation from the wall of the vessel, and means for indicating the presence of the remaining portion of said direct current signal.

2. The method of determining information concerning an object, comprising: subjecting the object to radiation from a radiation emitter; converting pulses of radiation coming from the object into light energy, the latter being of a pulse form corresponding to the pulse form of the radiation coming from the object; converting the light energy to electrical energy in the form of signal pulses corresponding to the pulses of radiation from the object; amplifying said signal pulses to a predetermined substantially constant amplitude independent of the relative amplitudes of the original signal pulses; integrating said amplified signal pulses to obtain a signal voltage substantially proportional in amplitude to the mean value of said signal pulses.

3. The method of determining the presence of a primary object by measuring radiation reflected therefrom and directed thereto by a radiation emitter and wherein said object is associated with another object of a background nature giving rise to a large signal of background reflected radiation, comprising: converting the pulses of radiation coming from the objects to electrical energy in the form of corresponding signal pulses; amplifying all of said electrical signal pulses to a value less than the amplitude of the smallest background pulse but greater than the amplitude of the largest pulse corresponding to radiation coming from the primary object; and integrating said signal pulses after amplification to obtain a signal voltage substantially proportional to the mean value of said signal pulses wherein the change of the mean value represents substantially a change in the amount of reflected radiation coming from the primary object.

4. A nuclear radiation measuring device adapted to measure a primary object signal of small magnitude, as compared with a relatively large background signal mixed therewith, and comprising: means for detecting nuclear radiation; means for converting the detected nuclear radiation into electrical signal pulses of magnitudes corresponding to the magnitudes of the said background signal and the said primary object signal means for amplifying said electrical signal pulses to a predetermined substantially constant amplitude at which the amplitude of those pulses representing radiation from the primary object are of significant magnitude as compared with the resulting substantially constant amplitude of signal pulses corresponding to background radiation; means for integrating said amplified signal pulses and means for indicating the variation in amplitude of the mean value of the integrated signal pulses.

5. The combination claimed in claim 4 wherein the integrating means has a time constant greater than one tenth of a second; and biasing means for removing an unwanted component of the integrated electrical pulses.

References Cited in the file of this patent

UNITED STATES PATENTS

| Number | Name | Date |
|---|---|---|
| Re. 22,531 | Hare | Aug. 22, 1944 |
| 2,348,810 | Hare | May 15, 1944 |
| 2,483,139 | Herzog | Sept. 27, 1949 |
| 2,486,946 | Herzog | Nov. 1, 1949 |
| 2,517,404 | Morton | Aug. 1, 1950 |
| 2,534,932 | Sun | Dec. 19, 1950 |